United States Patent
Panciroli

(10) Patent No.: US 7,509,803 B2
(45) Date of Patent: Mar. 31, 2009

(54) METHOD AND DEVICE FOR CONTROLLING THE SPEED OF ROTATION OF A TURBOSUPERCHARGER IN AN INTERNAL-COMBUSTION ENGINE

(75) Inventor: Marco Panciroli, Ravenna (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 269 days.

(21) Appl. No.: 11/427,934

(22) Filed: Jun. 30, 2006

(65) Prior Publication Data

US 2007/0033936 A1 Feb. 15, 2007

(30) Foreign Application Priority Data

Jul. 5, 2005 (EP) ................... 05425478

(51) Int. Cl.
*F02D 23/00* (2006.01)
(52) U.S. Cl. .......................... 60/600; 60/602
(58) Field of Classification Search ........... 60/600–603; 123/564
See application file for complete search history.

(56) References Cited

U.S. PATENT DOCUMENTS

| | | | | |
|---|---|---|---|---|
| 5,363,652 A * | 11/1994 | Tanaka et al. | .................. | 60/603 |
| 5,829,254 A | 11/1998 | Hayashi et al. | | |
| 6,155,050 A | 12/2000 | Blanz et al. | | |
| 6,467,270 B2 * | 10/2002 | Mulloy et al. | .............. | 60/605.2 |
| 6,751,956 B2 * | 6/2004 | Mayer et al. | .................. | 60/602 |

FOREIGN PATENT DOCUMENTS

| | | |
|---|---|---|
| DE | 40 05 046 A1 | 9/1990 |
| DE | 4005046 | 9/1990 |
| WO | WO 03/071111 A1 | 8/2003 |
| WO | WO 03071111 | 8/2003 |

OTHER PUBLICATIONS

European Search Report dated Dec. 6, 2005 for corresponding Application No. EP 05425478.4-2311 filed Jul. 5, 2005; Inventor: Marco Panciroli.

* cited by examiner

*Primary Examiner*—Hoang M Nguyen
(74) *Attorney, Agent, or Firm*—Gottlieb, Rackman & Reisman

(57) ABSTRACT

Device for controlling the speed of a turbosupercharger in an internal-combustion engine comprising: a compressor, a turbine, a wastegate valve; the control device comprising: a calculating unit, which receives at input a set of parameters comprising a pre-set limit speed of rotation of the turbosupercharger, the air pressure measured at input to the compressor, and the mass flow rate of the compressor, and is designed to process the parameters for determining, through a predetermined map that characterizes operation of the compressor, a limit supercharging pressure correlated to the air pressure obtainable at output from the compressor in a condition of rotation of the turbine at a speed substantially equal to the preset limit speed of rotation; a comparison unit designed to verify whether a required objective supercharging pressure satisfies a preset relation with the calculated limit supercharging pressure; and a driving unit, which, in the case where the preset relation is satisfied, is designed to govern the wastegate valve for controlling the speed of the turbine as a function of the limit supercharging pressure so as to limit the speed of rotation of the turbosupercharger to a value substantially equal to the limit speed of rotation.

14 Claims, 3 Drawing Sheets

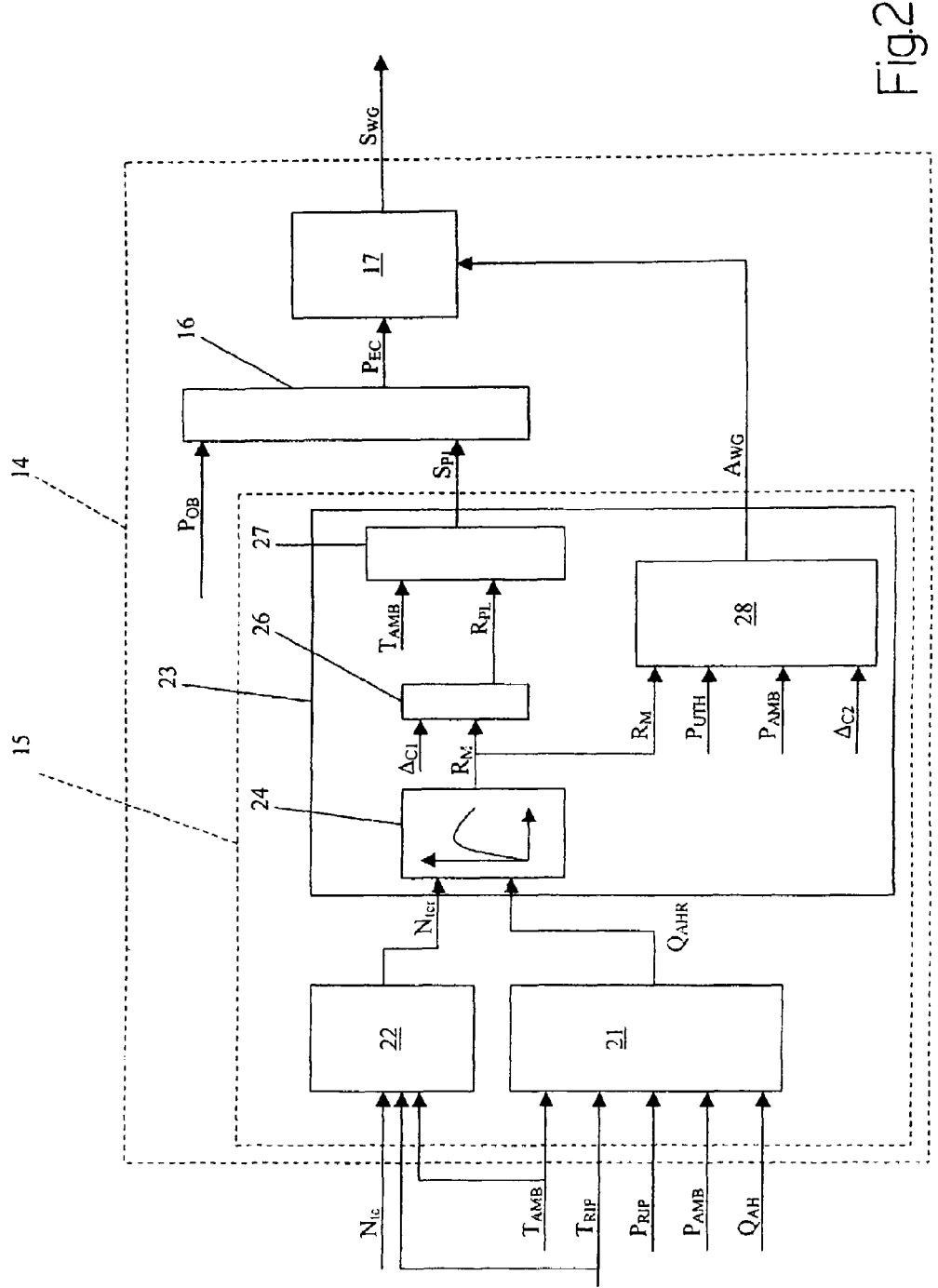

METHOD AND DEVICE FOR CONTROLLING THE SPEED OF ROTATION OF A TURBOSUPERCHARGER IN AN INTERNAL-COMBUSTION ENGINE

The present invention relates to a method and a device for controlling the speed of rotation of a turbosupercharger in an internal-combustion engine.

BACKGROUND OF THE INVENTION

As is known, some internal-combustion engines of motor vehicles are provided with a supercharging system, which is able to increase the power developed by the engine by exploiting the residual energy of the exhaust gases produced by the engine itself.

The supercharging systems of the type mentioned above are typically provided with a turbosupercharger consisting, in turn, of a turbine set along the exhaust pipe so as to turn at high speed under the action of the exhaust gases expelled by the engine, and of a compressor set along the air-feed pipe, which is connected to the turbine via a shaft for being driven in rotation by the turbine itself so as to "push" the air drawn in from outside towards the cylinders of the engine. The action of thrust generates a supercharging, i.e., an increase of the air pressure supplied to the engine, which determines an increase of the power developed thereby.

It is moreover known that in supercharging systems of the type described above it is necessary to be able to limit, as the conditions of operation of the engine vary, the maximum speed of rotation of the turbosupercharger both for functional reasons and for structural reasons so as to prevent critical operating situations that can cause damage to the turbosupercharger.

U.S. Pat. No. 5,829,254 discloses a supercharging pressure control device, in which the speed of the turbocharger of an internal combustion engine for an aircraft is controlled by adjusting the opening of a waste gate valve. In the control device of the internal combustion engine, an inlet air flow rate of a turbocharger compressor, an inlet air pressure, an inlet air temperature, and an air-fuel ratio of the internal combustion engine are detected by respective corresponding sensors. Under these conditions, a pressure ratio of the compressor where the turbocharger is operated near the maximum allowable speed is calculated. At the same time, the waste gate valve opening is controlled so as to obtain the calculated pressure ratio. By this, the turbocharger is constantly operated near the maximum allowable speed.

SUMMARY OF THE INVENTION

The aim of the present invention is therefore to provide a device for controlling the speed of rotation of a turbosupercharger in an internal-combustion engine that will be simple and inexpensive and able to ensure that, in any condition of operation of the engine, the speed of rotation of the turbosupercharger will always remain below a pre-set value.

According to the present invention, provided herein is a method for controlling the speed of rotation of a turbosupercharger in an internal-combustion engine as claimed in the attached Claims.

According to the present invention, there is provided a device for controlling the speed of rotation of a turbosupercharger in an internal-combustion engine as claimed in the attached Claims.

BRIEF DESCRIPTION OF THE DRAWINGS

The present invention will now be described with reference to the attached drawings, which illustrate a non-limiting example of embodiment thereof, and in which:

FIG. 2 shows a block diagram of an electronic control unit comprised in the device illustrated in FIG. 1 for controlling the speed;

DETAILED DESCRIPTION OF THE INVENTION

Figure 1:
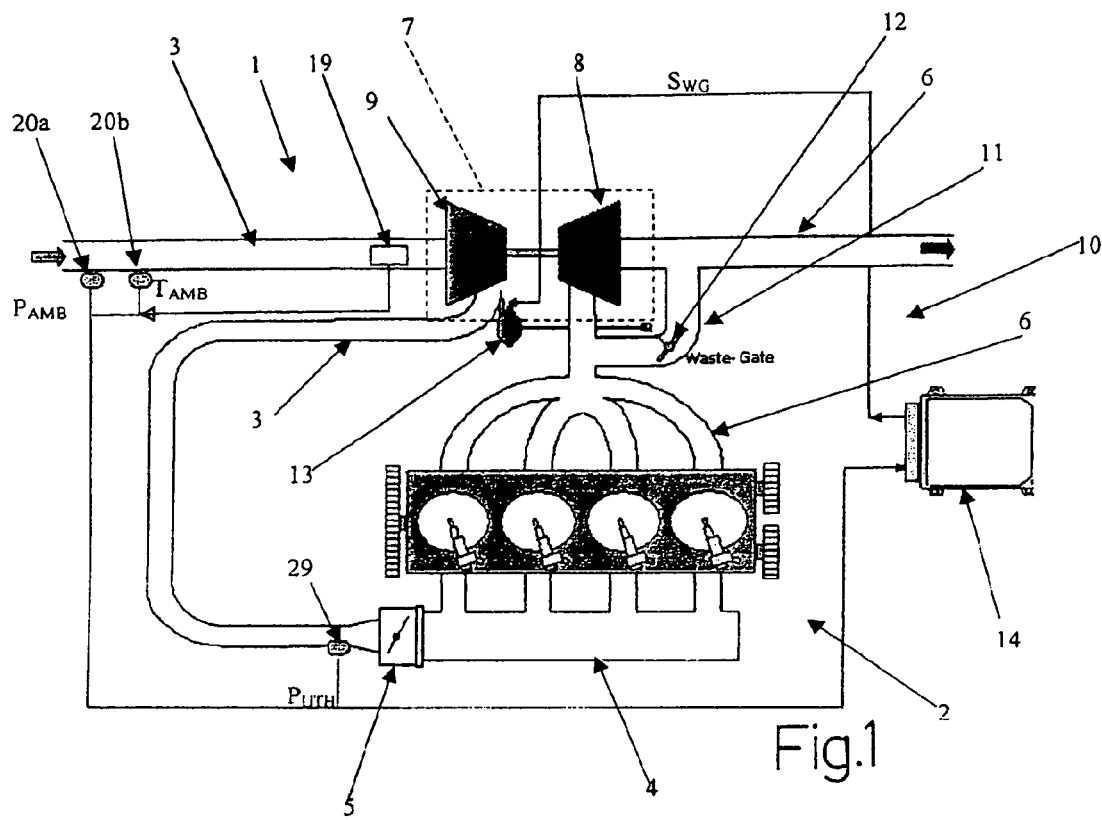
FIG. 1 is a schematic illustration of a supercharging system provided with a device for controlling the speed of rotation of a turbosupercharger, in accordance with the teachings of the present invention.

With reference to FIG. 1, number 1 designates as a whole a supercharging system having the function of increasing the mechanical power developed by an engine 2 by exploiting the residual energy of the exhaust gases produced by the engine 2 itself.

The engine 2 comprises: an intake pipe 3 designed to take in air, or any similar fluid, from the external environment; a manifold 4 connected to the intake pipe 3 for receiving the air and supplying it to the cylinders of the engine 2; and a throttle valve 5, which is set between the intake pipe 3 and the manifold 4 for regulating the inflow of air supplied at input to the engine 2. The engine 2 is moreover provided with an exhaust pipe 6, through which the exhaust gases generated by the engine 2 following upon combustion are expelled towards the external environment.

With reference to FIG. 1, the supercharging system 1 comprises, instead, a turbosupercharger 7 in turn comprising a turbine 8, which is set along the exhaust pipe 6 for turning at high speed under the action of the exhaust gases expelled from the engine 2, and a compressor 9, which is set along the intake pipe 3 and is mechanically connected to the turbine 8 for being driven in rotation by the turbine 8 itself so as to increase the air pressure supplied in the manifold 4, so bringing about supercharging of the engine 2.

The system 1 comprises a device 10 for controlling the speed of rotation of the turbosupercharger 7, which in turn comprises: a bypass pipe 11 connected to the exhaust pipe 6 in parallel to the turbine 8, in such a way as to present one of its ends connected upstream and the other downstream of the turbine 8 itself; a regulation valve, designated hereinafter as wastegate valve 12, which is set along the bypass pipe 11 for regulating the flow rate of the exhaust gases supplied at input to the turbine 8; and an actuator 13 of a known type having the function of actuating upon command the wastegate valve 12.

The control device 10 moreover comprises an electronic control unit 14, which has the function of governing, by means of the actuator 13, the wastegate valve 12 in such a way as to enable a part of the exhaust gases expelled from the engine 2 to reach the terminal part of the exhaust pipe 6 directly, without passing through the turbine 8, thus enabling control of the speed of rotation of the turbine 8 itself.

With reference to FIG. 2, the electronic control unit 14 basically comprises a calculating unit 15, which receives at input: a signal correlated to the mass flow rate $Q_{AH}$ of the compressor 9, determined via an estimation or a measurement of the mass of air that traverses the compressor 9 itself per unit time; a signal correlated to a pre-set limit speed $N_{tc}$ of the turbosupercharger 7, beyond which the latter goes into a critical condition; and the temperature $T_{AMB}$ of the air measured upstream of the compressor 9.

The calculating unit 15 calculates, as a function of the parameters $Q_{AH}$, $T_{AMB}$ and $N_{tc}$ received at input and on the basis of a pre-determined map that characterizes operation of the compressor 9 (described in detail hereinafter), a limit supercharging pressure $S_{P1}$ correlated to the pressure obtainable at output from the compressor 9 when the turbine 8 turns at a speed substantially equal to the pre-set limit speed $N_{tc}$. In other words, the limit supercharging pressure $S_{P1}$ indicates the maximum supercharging pressure that can be reached at output from the compressor 9, exceeding of which corresponds to a speed of rotation of the turbosupercharger 7 higher than the pre-set limit speed $N_{tc}$ that can be withstood by the turbosupercharger 7 itself.

The electronic control unit 14 further comprises a comparison unit 16, which receives at input the limit supercharging pressure $S_{P1}$, and an objective pressure $P_{OB}$, which indicates the value of the supercharging pressure that, on the basis of an objective map of the engine (known and not illustrated) and of a set of parameters of engine operation (such as, for example, engine r.p.m., efficiency of intake of the engine, etc.) is required of the system 1 downstream of the compressor 9, i.e., at input to the engine 2.

In particular, the comparison unit 16 is able to verify whether the objective pressure $P_{OB}$ satisfies or not a given relation (described in detail hereinafter) with the limit supercharging pressure $S_{P1}$, and generates at output a signal containing a command pressure $P_{EC}$, to which is assigned, according to the outcome of said verification, the limit supercharging pressure $S_{P1}$ ($P_{EC}=S_{P1}$) or, alternatively, the objective pressure $P_{OB}$ ($P_{EC}=P_{OB}$).

The electronic control unit 14 moreover comprises a driving unit 17, which receives at input the signal containing the command pressure $P_{EC}$ and generates according to the latter a signal $S_{WG}$, which governs, via the actuator 13, the wastegate valve 12 so as to regulate the pressure of the exhaust gases supplied at input to the turbine 8 so as to increase/decrease the speed of rotation of the turbine 8 and of the compressor 9, thus causing the command pressure PEC in the intake pipe 3 to be reached downstream of the compressor 9.

With reference to FIG. 2, the calculating unit 15 is able to generate the limit supercharging pressure $S_{P1}$ on the basis of a pre-determined map of operation, which contains a plurality of characteristic curves of operation of the compressor 9, designated hereinafter by $C_i$ (with i ranging from 1 to n), each of which is associated to a given constant speed $V_{tc}$ and gives the compression ratio $R_p$ between the air pressure at output $P_O$ to the compressor 9 and the air pressure $P_{AMB}$ supplied at input to the compressor 9 itself as a function of its mass flow rate $Q_{AH}$.

In particular, the calculating unit 15 is designed to process the pre-determined map of operation for identifying the characteristic curve of operation $C_i$ associated to the speed $V_{tc}$ that corresponds to the limit speed $N_{tc}$, and determines through the curve $C_i$ identified, and as a function of the mass flow rate $Q_{AH}$, the maximum compression ratio $R_M$ of the compressor 9. Once the maximum compression ratio $R_M$ has been determined, the calculating unit 15 is able to determine, according to the pressure $P_{AMB}$ of the air measured at input to the compressor 9, the threshold limit of supercharging $S_{P1}$ to be supplied at input to the comparison unit 16. In the case in point, the calculating unit 15 is designed to determine the threshold limit of supercharging $S_{P1}$ by multiplying the maximum compression ratio $R_M$ by the air pressure $P_{AMB}$ ($S_{P1}=R_M*P_{AB}$).

It should be pointed out that the pre-determined map of operation and the corresponding curves $C_i$ of operation of the compressor 9 are determined in a step of testing and calibration of the turbosupercharger 7, during which the physical quantities of interest, i.e., the speed of rotation $V_{tc}$, the mass flow rate $Q_{AH}$, and the compression ratio $R_M$ are measured and determined in a reference condition characterized by a reference temperature $T_{RIF}$ and a reference pressure $P_{RIF}$. In the case in point, the pre-determined map of operation and the corresponding curves $C_i$ of operation are typically supplied in a "normalized" form in such a way as to enable determination of the aforesaid parameters in any condition of operation of the turbosupercharger 7 other than the reference condition.

Figure 3:
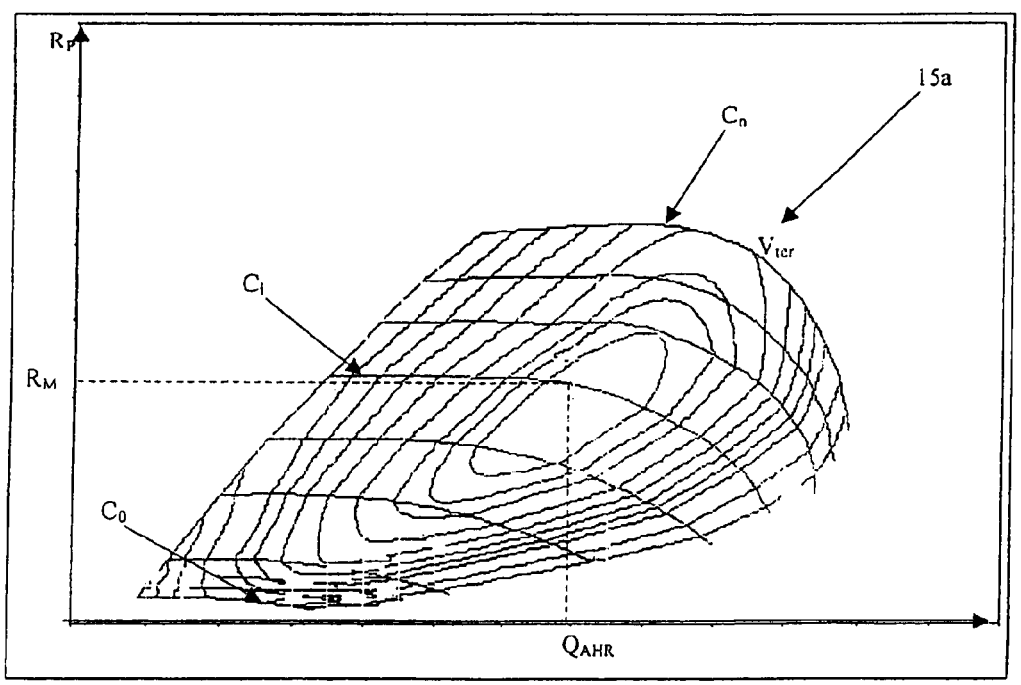
FIG. 3 shows a map of operation of the compressor comprising a set of curves, each of which is associated to a speed of rotation and represents the curve of the compression ratio of the compressor as a function of its mass flow rate; whilst
Figure 4:
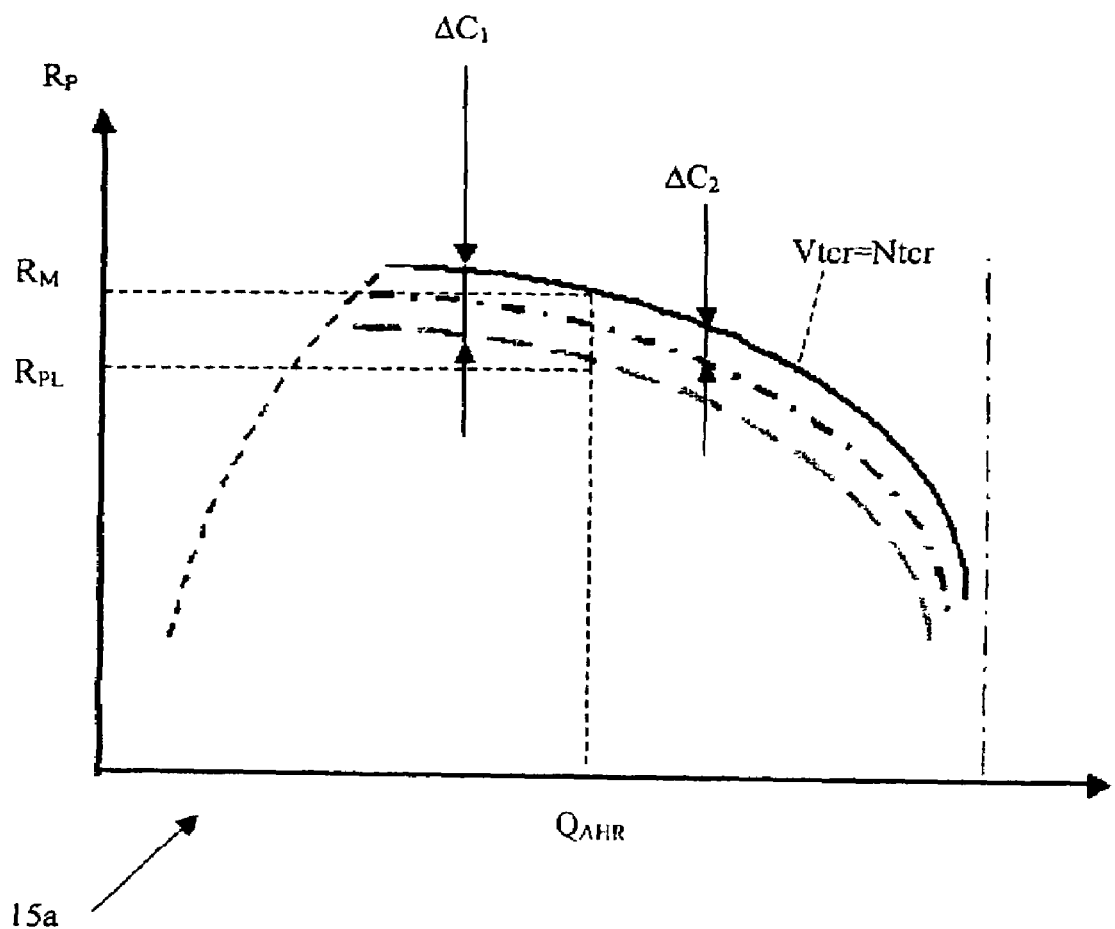
FIG. 4 shows a detail of the map of operation of the compressor in which two limit thresholds are represented, one of which defines an area of inhibition of the control of speed and the other an area of limitation of the speed.

With reference to the example illustrated in FIGS. 3 and 4, the map of operation 15a stored in the calculating unit 15 and the corresponding parameters are preferably, but not necessarily, "normalized" with respect to the pre-set reference conditions adopted in the measurements made during testing and calibration of the turbosupercharger 7. In particular, the curves $C_i$ of the map of operation 15a are "normalized", i.e., are referred to the pre-set reference conditions ($P_{RIF}$ and $T_{RIF}$) to enable determination of the compression ratio $R_P$ in any condition of operation of the turbosupercharger 7 different from the pre-set reference condition.

In greater detail, each curve $C_i$ of the "normalized" map of operation illustrated in FIGS. 3 and 4 is associated to a reduced speed $V_{tcr}$ calculated using the following relation:

$$Vtcr = Vtc * \sqrt{\frac{T_{RIF}}{T_{AMB}}} \qquad \text{a)}$$

whilst the mass flow rate $Q_{AH}$ is normalized using the following relation:

$$Q_{AHR} = Q_{AH} * \sqrt{\frac{T_{AMB}}{T_{RIF}} * \frac{P_{RIF}}{P_{AMB}}}, \quad \text{where:} \qquad \text{b)}$$

$Q_{AHR}$ is the reduced mass flow rate of the compressor 9; it should be pointed out that the mass flow rate $Q_{AH}$ can be estimated in a known way on the basis of a set of parameters of engine operation, or else can be measured by means of a flow meter 19 set in the intake pipe 3 preferably upstream of the compressor 9; and $P_{AMB}$ and $T_{AMB}$ are, respectively, the pressure and the temperature of the air in the intake pipe 3, which can be measured preferably through respective sensors 20a and 20b located in positions corresponding to the intake pipe 3 itself upstream of the compressor 9.

With reference to the example illustrated in FIGS. 2, 3 and 4, the calculating unit 15 basically comprises a calculation module 21, which receives at input the mass flow rate $Q_{AH}$, the pressure $P_{AMB}$ and preferably, the temperature $T_{AMB}$ of the air measured upstream of the compressor 9, the reference pressure $P_{RIF}$ and the reference temperature $T_{RIF}$ associated to the curves $C_i$ of the pre-determined map 15a, and supplies at output the reduced mass flow rate $Q_{AHR}$ determined by applying the relation b) appearing above.

The calculating unit 15 moreover comprises a calculation module 22, which receives at input the pre-set limit speed $N_{tc}$, preferably the temperatures $T_{AMB}$ and $T_{RIF}$, and is designed to implement the relation $$N_{tcr} = M_{tc} * \sqrt{\frac{T_{RIF}}{T_{AMB}}}$$

in order to supply at output the reduced limit speed $N_{tcr}$ normalized with respect to the reference condition.

With reference to FIG. 2, the calculating unit 15 further comprises a processing module 23, which receives at input the reduced limit speed $N_{tcr}$ and the reduced mass flow rate $Q_{AHR}$ and supplies at output the limit supercharging pressure $S_{P1}$ and a signal $A_{WG}$ containing a command for enabling/disabling control of the wastegate valve 12 by the system 1 (described hereinafter)

In particular, in the example illustrated in FIG. 2, the processing module 23 comprises a processing block 24, which contains the pre-determined map 15a in the "normalized" form, and is designed to determine in the map itself the curve $C_i$ associated to the reduced speed $V_{tcr}$ corresponding to the reduced limit speed $N_{tcr}$.

In greater detail, with reference to FIG. 4, following upon the identification of the curve $C_i$ corresponding to the reduced limit speed $N_{tcr}$, the processing block 24 determines, as a function of the reduced mass flow rate $Q_{AHR}$, a maximum compression ratio $R_M$ and supplies it at output.

With reference to FIG. 2, the processing module 23 moreover comprises, preferably, but not necessarily, a calculation block 26, which receives at input the maximum compression ratio $R_M$ and subtracts from the latter a first safety threshold $\Delta C_1$ for determining a limit compression ratio $R_{PL}$($R_{PL}$=$R_M$-$\Delta C_1$).

It should be pointed out that the first safety threshold $\Delta C_1$ is established in such a way as to determine "a limit area of operation" of the compressor 9, within which the control device 10 intervenes on the wastegate valve 12 to limit the speed of rotation of the turbosupercharger 7. The limit area of operation is represented schematically in FIG. 4 and is delimited at the top by the curve $C_i$ which presents a speed $V_{tcr}$ that corresponds to the reduced limit speed $N_{tcr}$ and at the bottom by a curve associated to the first safety threshold $\Delta C_1$ (represented with a dashed line). It is thus evident that the regulation of the first safety threshold $\Delta C_1$ advantageously enables definition of the limit speed of rotation assigned to the turbosupercharger 7.

The processing module 23 moreover comprises a calculation block 27, which receives at input the limit compression ratio $R_{PL}$ and the pressure $P_{AMB}$ and supplies at output the limit supercharging pressure $S_{P1}$. In the case in point, the calculation block 27 calculates the limit supercharging pressure $S_{P1}$ using the following relation $S_{P1}$=$R_{PL}$*$P_{AMB}$.

With reference to FIG. 2, the processing module 23 moreover comprises a deactivation block 28, which receives at input the maximum compression ratio $R_M$, the pressure $P_{AMB}$, a pressure $P_{UTH}$ corresponding to the air pressure measured downstream of the compressor 9 through a sensor 29 set in a position corresponding to the throttle valve 5, and a second pre-set safety threshold $\Delta C_2$ (represented in FIG. 4) and supplies at output the signal $A_{WG}$ containing the command for enabling/disabling supercharging.

In particular, the deactivation block 28 is designed to perform the following operations: determining an effective compression ratio $R_E$=$P_{UTH}$/$P_{AMB}$ corresponding to the ratio between the pressure $P_{UTH}$ measured at output from the compressor 9 and the pressure $P_{AMB}$ measured at input to the compressor 9; subtracting from the maximum calculated compression ratio $R_M$ the second safety threshold $\Delta C_2$ in order to determine a deactivation compression ratio $R_D$= ($R_M$-$\Delta C_2$); and checking whether the effective compression ratio $R_E$ satisfies or not a pre-set relation of comparison with the deactivation compression ratio $R_D$. In the case in point, if the effective compression ratio $R_E$ is greater than or equal to the deactivation compression ratio $R_D$ ($R_E \geq R_D$), then the deactivation block 28 encodes in the signal $A_{WG}$ a command for deactivation of the wastegate valve 12 (which brings about a partial or total reduction of supercharging), whereas, if the effective compression ratio $R_E$ is lower than the deactivation compression ratio $R_D$, the deactivation block 27 encodes in the signal $A_{WG}$ a command that brings about activation of the control of the wastegate valve 12 (condition of control of supercharging).

In greater detail, the deactivation block 28 supplies the signal $A_{WG}$ to the driving unit 17, which, in the case where the signal $A_{WG}$ encodes the activation command, governs the wastegate valve 12 according to the command pressure $P_{EC}$ in such a way as to control the speed of rotation of the turbosupercharger 7 (consequently maintaining supercharging active).

If, instead, the signal $A_{WG}$ encodes the disabling command, the driving unit 17 goes into a condition of inhibition in regard to governing of the wastegate valve 12. In this latter case, the wastegate valve 12 can automatically go into a pre-set operative condition, in which supercharging is partially or completely reduced. For example, upon onset of the condition of inhibition, the supercharging system 1 can cease electronic control of the wastegate valve 12 and envisage a control thereof of a traditional type, for example a "mechanical" control, in which the actuator 13, under the air pressure generated at output from the intake pipe 3 actuates the wastegate valve 12 when the pressure reached downstream of the compressor 9 exceeds a pre-set limit threshold. Exceeding of said pressure threshold, in fact, brings about a mechanical control of the actuator 13, which actuates the wastegate valve 12, so causing a limitation of the speed of the turbine 8 and a corresponding reduction of supercharging.

In the above description, it is to be noted that the second safety threshold $\Delta C_2$ is established in such a way as to determine a "deactivation area" of the turbosupercharger 7 within which the control device 10 intervenes on the wastegate valve 12 to reduce partially or completely supercharging of the engine 2. The deactivation area is represented schematically in FIG. 4 and is delimited at the top by the curve $C_i$ corresponding to the reduced limit speed $V_{tcr}$=$N_{tcr}$ and at the bottom by a curve associated to the second safety threshold $\Delta C_2$ (represented with dashed and dotted line). It is consequently evident that the regulation of the second safety threshold $\Delta C_2$ advantageously makes it possible to establish the intervention for disabling the supercharging from the control device 10.

In the above description, it is to be noted that the first safety threshold $\Delta C_1$ and/or the second safety threshold $\Delta C_2$ can assume a constant value or else can vary each as a function of a set of parameters associated to the air taken in by the compressor 9, such as for example the temperature $T_{AMB}$, the mass flow rate $Q_{AH}$, the pressure $P_{AMB}$, and the pressure $P_{UTH}$, and/or as a function of one or more engine operating parameters, such as, for example, the pressure of the manifold 4, the temperature of the engine oil, the temperature of the oil of the turbosupercharger 7, the temperature of the engine coolant, the engine r.p.m., etc.

As regards the comparison unit 16, this compares the required objective pressure $P_{OB}$ with the limit supercharging pressure $S_{P1}$ and assigns to the command pressure $P_{EC}$, according to the outcome of the comparison, the objective pressure $P_{OB}$ or the limit supercharging pressure $S_{P1}$. In the case in point, in the example illustrated, if the objective pressure $P_{OB}$ required is lower than or equal to the limit supercharging pressure $S_{P1}$, the comparison unit 16 assigns to the command pressure $P_{EC}$ the objective pressure $P_{OB}$. In this case, the driving unit 17, having received at input the objective pressure $P_{OB}$, regulates the speed of the turbosupercharger 7 in such a way as to achieve a supercharging corresponding to the objective pressure $P_{OB}$ itself.

If, instead, the objective pressure $P_{OB}$ required is higher than the limit supercharging pressure $S_{P1}$, the comparison unit 16 assigns to the command pressure $P_{EC}$ the limit supercharging pressure $S_{P1}$. In this case, the driving unit 17, having received the limit supercharging pressure $S_{P1}$, limits the speed of rotation of the turbosupercharger 7 to a value corresponding to the maximum pre-set speed $N_{tc}$, maintaining in this way a limit supercharging pressure $S_{P1}$ downstream of the compressor 9.

In the above description, it is to be noted that the control device 10 can be without the sensor 20b for measurement of the temperature $T_{AMB}$ and that the reduced mass flow rate $Q_{AHR}$ can be "partially" normalized on the basis of the ratio between the pressures $P_{RIF}/P_{AMB}$, without taking into account the ratio between the temperatures $T_{AMB}$ and $T_{RIF}$. In this case, it is advantageously possible to "compensate" for the "partial" normalization and hence guarantee a given safety margin in the limitation of the maximum speed, by appropriately varying the first safety threshold $\Delta C_1$ and/or the second safety threshold $\Delta C_2$.

The control device 10 of the supercharging system 1 presents the advantage of being simple and inexpensive to produce in so far as it does not require any additional measurement devices, such as for example speed-measuring sensors installed in the turbosupercharger 7 to measure its speed of rotation, but uses the sensors typically present in traditional engine and supercharging control systems. In addition, the control device 10 presents the advantage of ensuring a limitation of the speed of rotation of the turbosupercharger as the environmental conditions and/or the state of engine operation vary.

Finally, it is clear that modifications and variations may be made to the control device described and illustrated herein, without thereby departing from the scope of the present invention, defined in the annexed claims.

In particular, according to a variant (not illustrated), the map of operation of the turbosupercharger can be associated to a given limit-speed threshold that is "not reduced" i.e., not normalized with respect to the reference temperature $T_{RIF}$, whilst each curve $C_i$ of the map itself can be associated to a given temperature T of the air at input to the compressor 9 and provides the graph of the compression ratio $R_P$ as a function of the reduced mass flow rate $Q_{AR}$. In this case, the calculating unit 15 is without the calculation block 22, and the calculation block 24 determines the curve $C_i$ to be used for calculation of the maximum compression ratio $R_M$ as a function of the temperature $T_{AMB}$ of the air.

The invention claimed is:

1. A method (1) for controlling the speed of rotation of a turbosupercharger (7) in an internal-combustion engine (2) of a motor vehicle comprising: a compressor (9), a turbine (8) for driving the compressor (9) in rotation under the action of the exhaust gases of the engine (2); and a wastegate valve (12) for regulating the flow rate of the exhaust gases provided at input to the turbine (8) for controlling the speed of rotation of the turbine (8) itself as a function of an objective supercharging pressure ($P_{OB}$) which indicates the value of the supercharging pressure that, on the basis of an objective map of the engine and of a set of parameters of engine is required at output from said compressor (9); said method being characterized in that it comprises the steps of:

establishing a limit speed of rotation ($N_{tc}$) of the turbosupercharger (7); and during control of the speed of rotation of the turbine (8) performed through said wastegate valve (12), implementing the following steps:

measuring the pressure ($P_{AMB}$) of the air taken in at input by the compressor (9);

determining the mass flow rate ($Q_{AH}$) of the compressor (9);

calculating, through a predetermined map (15a) that characterizes operation of the compressor (9) and as a function of the preset limit speed of rotation ($N_{tc}$), of the measured air pressure ($P_{AMB}$), and of the mass flow rate ($Q_{AH}$), a limit supercharging pressure ($S_{P1}$), which is correlated to the air pressure obtainable at output from the compressor (9) when the turbine (8) turns at a speed substantially equal to said pre-set limit speed ($N_{tc}$);

verifying whether the required objective supercharging pressure ($P_{OB}$) satisfies a pre-set relation with said calculated limit supercharging pressure ($S_{P1}$), said preset relation being satisfied when said required objective pressure ($P_{OB}$) is higher than said limit supercharging pressure ($S_{P1}$); and in the case where said relation is satisfied, actuating said wastegate valve (12) for controlling the speed of rotation of the turbine (8) as a function of the limit supercharging pressure ($S_{P1}$) so as to limit the speed of rotation of said turbosupercharger (7) to a value substantially equal to said preset limit speed ($N_{tc}$):

in the case where said relation is not satisfied, actuating said wastegate valve (12) for controlling the speed of rotation of the turbine (8) as a function of the objective supercharging pressure ($P_{OB}$) so as to achieve a supercharging corresponding to the objective pressure ($P_{OB}$) itself.

2. The method according to claim 1, characterized in that said predetermined map (15a) comprises a plurality of characteristic curves of operation ($C_i$), each of which is associated to a respective speed ($V_{tc}$) of rotation of the compressor (9) and is designed to yield a maximum compression ratio ($R_M$) of the compressor (9) itself as a function of its mass flow rate ($Q_{AH}$) and of the preset limit speed ($N_{tc}$); said step of calculating the limit supercharging pressure ($S_{P1}$) comprises the step of identifying, on said pre-determined map (15a), the characteristic curve of operation ($C_i$) associated to a value of speed ($V_{tc}$) corresponding to the preset limit speed ($N_{tc}$).

3. The method according to claim , characterized in that said predetermined map (15a) comprises a plurality of characteristic curves of operation ($C_i$), which are associated to one and the same speed ($V_{tc}$) of rotation of the compressor (9), are each correlated to a respective temperature (T) of the air at input to the compressor (9), and are designed to yield a maximum compression ratio ($R_M$) of the compressor (9) itself as a function of its mass flow rate ($Q_{AH}$) and of the temperature ($T_{AMB}$) of the air measured at input to the compressor (9); said step of calculating the limit supercharging pressure ($S_{P1}$) comprises the step of identifying a characteristic curve of operation ($C_i$) associated to a temperature (T) corresponding to the ambient temperature ($T_{AmB}$) measured upstream of said compressor (9).

4. The method according to claim 2, characterized in that said step of calculating the limit supercharging pressure ($S_{P1}$) comprises the steps of determining a maximum compression ratio ($R_M$) by means of the characteristic curve of operation ($C_i$) identified, and as a function of said mass flow rate ($Q_{AH}$); and calculating said limit supercharging pressure ($S_{P1}$) as a function of said maximum compression ratio ($R_M$) and of said measured pressure ($P_{AMB}$) of the air.

5. The method according to claim 1, characterized in that it comprises the step of establishing a first safety threshold ($\Delta C_1$), and in that said step of determining a maximum compression ratio ($R_M$) comprises the step of determining a limit compression ratio ($R_{PL}$) by making a difference between said maximum compression ratio ($R_M$) and said first safety threshold ($\Delta C_1$); said limit supercharging pressure ($S_{P1}$) being determined as a function of the limit compression ratio ($R_{PL}$) and of the air pressure ($P_{AMB}$) measured at input to the compressor (9).

6. The method according to claim 1, characterized in that it comprises the steps of establishing a second safety threshold ($\Delta C_2$), measuring the air pressure ($P_{UTH}$) supplied at output from the compressor (9), determining an effective compression ratio ($R_E$) between the pressures measured at output ($P_{UTH}$) from and, respectively, at input to the compressor (9), determining a deactivation compression ratio ($R_D$) as a function of the difference between said maximum compression ratio ($R_M$) and said second safety threshold ($\Delta C_2$), verifying whether said effective compression ratio ($R_E$) satisfies or not a preset relation of comparison with the deactivation compression ratio ($R_D$), and disabling or not control of said wastegate valve (12) according to the result of said verification.

7. The method according to claim 6, characterized in that said first and/or second safety thresholds ($\Delta C_1$, $\Delta C_2$) can each assume a preset constant value, or else can be varied each as a function of one or more parameters ($T_{AMB}$, $Q_{AH}$, $P_{AMB}$, $P_{UTH}$) correlated to the air taken in by the compressor (9), and/or as a function of one or more engine operating parameters (2).

8. The method according claim 4, characterized in that the characteristic curves ($C_i$) of the predetermined map of operation (15a) and the corresponding parameters ($V_{tcr}$, $Q_{AHR}$) that characterize said curves are normalized with respect to a reference pressure ($P_{RIF}$) and/or reference temperature ($T_{RIF}$); said step of calculating the limit supercharging pressure ($S_{P1}$) comprises the steps of identifying the curve of operation ($C_i$) corresponding to a preset normalized limit speed ($N_{tcr}$), and determining, on the basis of the curve ($C_i$) identified, a maximum compression ratio ($R_M$) as a function of a normalized mass flow rate ($Q_{AHR}$).

9. A device (10) for controlling the speed in an internal-combustion engine of a motor vehicle comprising: a compressor (9); a turbine (8), designed to drive said compressor (9) in rotation under the action of the exhaust gases of the engine (2); and a wastegate valve (12), designed to regulate the flow rate of the exhaust gases provided at input to the turbine (8); said control device (10) comprising a control unit (14) designed to govern said wastegate valve (12) for controlling the speed of rotation of the turbine (8) as a function of an objective supercharging pressure ($P_{OB}$) which indicates the value of the supercharging pressure that, on the basis of an objective map of the engine and of a set of parameters of engine is required at output from said compressor (9); said control device (10) being characterized in that it comprises:

first sensor means (20a) for measuring the air pressure ($P_{AMB}$) at input to said compressor (9); and in that said control unit (14) comprises:

a calculating unit (15), which receives at input a set of parameters comprising a pre-set limit speed ($N_{tc}$), said air pressure ($P_{AMB}$) measured at input to the compressor (9), and the mass flow rate ($Q_{AH}$) of said compressor (9), and is designed to process said parameters for determining, through a predetermined map (15a) that characterizes operation of the compressor (9), a limit supercharging pressure ($S_{P1}$) correlated to the air pressure obtainable at output from the compressor (9) in a condition in which the turbine (8) turns at a speed substantially equal to the preset maximum limit speed ($N_{tc}$);

a comparison unit (16), designed to verify whether the required objective supercharging pressure ($P_{OB}$) satisfies a pre-set relation with said calculated limit supercharging pressure ($S_{P1}$), said pre-set relation being satisfied when said required objective pressure ($P_{OB}$) is higher than said limit supercharging pressure ($S_{P1}$); and a driving unit (17), which, in the case where said pre-set relation is satisfied, is designed to govern said wastegate valve (12) for controlling the speed of rotation of the turbine (8) as a function of the limit supercharging pressure ($S_{P1}$) so as to limit the speed of rotation of said turbosupercharger (7) to a value substantially equal to said pre-set limit speed ($N_{tc}$), and in the case where said pre-set relation is not satisfied, said driving unit (17) being able to actuate said wastegate valve (12) for controlling the speed of rotation of the turbine (8) as a function of the objective supercharging pressure ($P_{OB}$) so as to achieve a supercharging corresponding to the objective pressure ($P_{OB}$) itself.

10. The device according to claim 9, characterized in that said calculating unit (15) comprises first calculation means (24) containing said pre-determined map (15a), which in turn comprises a plurality of curves of operation ($C_i$), each of which is associated to a pre-set speed ($V_{tc}$) and is designed to yield a maximum compression ratio ($R_M$) of the compressor (9) as a function of its given mass flow rate ($Q_{AH}$) and as a function of said limit speed ($N_{tc}$); said first calculation means (24) being designed to identify the curve of operation ($C_i$) associated to a pre-set speed ($V_{tc}$) corresponding to the pre-set limit speed ($N_{tc}$).

11. The device according to claim 9, characterized in that said calculating unit (15) comprises first calculation means (24) containing said pre-determined map (15a), which in turn comprises a plurality of curves of operation ($C_i$), which are associated to one and the same speed ($V_{tc}$) of rotation of the compressor (9), are each correlated to a respective temperature (T) of the air at input to the compressor (9), and are designed to yield a maximum compression ratio ($R_M$) of the compressor (9) itself as a function of its mass flow rate ($Q_{AH}$) and of the temperature of the air ($T_{AMB}$) measured upstream of said compressor (9); said first calculation means (24) being designed to identify the curve of operation ($C_i$) associated to a temperature (T) corresponding to the ambient temperature ($T_{AMB}$) measured upstream of said compressor (9).

12. The device according to claim 10, characterized in that said first calculation means (28) are designed to determine, on the basis of the curve ($C_i$) identified, a maximum compression ratio ($R_M$) as a function of said mass flow rate ($Q_{AH}$) so as to calculate said limit supercharging pressure ($S_{P1}$) as a function of said maximum compression ratio ($R_M$) and said measured air pressure ($P_{AMB}$).

13. The device according to claim 12, characterized in that said calculating unit (15) comprises second calculation means (26), which receive at input a first preset safety threshold ($\Delta C_1$) and are designed to determine a limit compression ratio ($R_{PL}$) as a function of the difference between said maximum safety ratio ($R_M$) and said first safety threshold ($\Delta C_1$); and third calculation means (27) designed to determine said limit supercharging pressure ($S_{P1}$) as a function of said limit compression ratio ($R_{PL}$) and of said measured pressure ($P_{AMB}$) of the air at input to the compressor (9).

14. The device according to claim 9, characterized in that it comprises:

second sensor means (29), designed to measure an air pressure ($P_{UTH}$) present at output from the compressor (9);

deactivation means (28) receiving at input a set of parameters containing a second preset safety threshold ($\Delta C_2$) and said air pressure ($P_{UTH}$), measured at output from the compressor (9); said deactivation means (28) being designed to: determine an effective compression ratio ($R_E$) between the air pressure ($P_{UTH}$) measured at output from said compressor (9) and the air pressure ($P_{AMB}$) measured at input to said compressor (9); determine a deactivation compression ratio ($R_D$) as a function of the difference between said maximum compression ratio ($R_M$) and said second safety threshold ($\Delta C_2$); and verify whether said effective compression ratio ($R_E$) satisfies or not a preset relation of comparison with the deactivation compression ratio ($R_D$) so as to disable or not control of said wastegate valve (12) according to the result of said verification.

* * * * *